United States Patent [19]

Boutaghou

[11] Patent Number: 5,696,649
[45] Date of Patent: Dec. 9, 1997

[54] ELASTIC INSERT SHROUD TO PROVIDE MAXIMUM EFFECTIVE SHROUDING SHOCK MITIGATION AND FILTERING IN HIGH SPEED DISK DRIVES

[75] Inventor: Zine-Eddine Boutaghou, Owatonna, Minn.

[73] Assignee: International Business Machines Corporation, Armonk, N.Y.

[21] Appl. No.: 445,478

[22] Filed: May 22, 1995

[51] Int. Cl.[6] .................................................. G11B 33/14
[52] U.S. Cl. ........................... 360/97.03; 360/97.02; 360/98.01
[58] Field of Search .................... 360/97.01, 97.02, 360/97.03, 97.04, 98.01; 369/263, 212, 75.1

[56] References Cited

U.S. PATENT DOCUMENTS

| | | | |
|---|---|---|---|
| 3,720,931 | 3/1973 | Andersen | 360/97.03 |
| 4,334,302 | 6/1982 | Peppers | 369/261 |
| 4,471,395 | 9/1984 | Beck et al. | 360/98.01 |
| 4,581,668 | 4/1986 | Campbell | 360/97.02 |
| 4,583,213 | 4/1986 | Bracken et al. | 369/261 |
| 4,636,891 | 1/1987 | Barski | 360/97.02 |
| 4,660,110 | 4/1987 | Iida et al. | 360/97.02 |
| 4,821,130 | 4/1989 | Barrett et al. | 360/78.04 |
| 5,031,059 | 7/1991 | Yamaguchi et al. | 360/97.03 |
| 5,124,855 | 6/1992 | Dew et al. | 360/97.02 |
| 5,124,856 | 6/1992 | Brown et al. | 360/97.03 |
| 5,517,372 | 5/1996 | Shibuya et al. | 360/97.02 |

FOREIGN PATENT DOCUMENTS

| | | | |
|---|---|---|---|
| 59-203286 | 11/1984 | Japan . | |
| 61-280090 | 12/1986 | Japan | 360/97.02 |

OTHER PUBLICATIONS

IBM Tech. Disclosure Bulletin, vol. 19, No. 2, Jul. 1976, S.E. Wheeler, Pressure Relief System for Disk Files.
Research Disclosure, 32375, p. 193, Mar. 1991, Circular Fin Between Disks for Reducing the Disk Flutter.

*Primary Examiner*—Jefferson Evans
*Assistant Examiner*—George J. Letscher
*Attorney, Agent, or Firm*—Laurence R. Letson

[57] ABSTRACT

A separate elastic shroud to surround a disk pack is inserted into a disk drive housing after the disk pack and the actuator of the disk drive have been merged. This improvement simplifies manufacturing and assembly. The shroud may contain a filter which permits the passage of air from within the shrouded enclosure to outside the shrouded enclosure, and the filter is disposed in a region wherein a positive pressure exists within the disk pack enclosure relative to the pressure immediately outside the shroud. The shroud further may be provided with flanges or ribs which will engage the periphery of deflected disks of the disk pack to eliminate disk-to-disk contact, thereby reducing damage to the disk drive mechanisms and the disks proper. The shroud, filter design and placement, as well as the inlet and outlet shapes of the shroud each contribute therefore to reduce energy consumption and temperature rises within the disk drive.

14 Claims, 2 Drawing Sheets

ELASTIC INSERT SHROUD TO PROVIDE MAXIMUM EFFECTIVE SHROUDING SHOCK MITIGATION AND FILTERING IN HIGH SPEED DISK DRIVES

FIELD OF THE INVENTION

This invention relates to high speed disk drives having a plurality of recordable disks in a disk pack and more specifically to shrouding of the disk pack of these high speed disk drives.

BACKGROUND OF THE INVENTION

A rotating disk pack of a high speed disk drive tends to cause the rotation and pumping of a substantial portion of the air mass within the disk pack. This air movement occurs as a result of the fluidic friction or shearing action between the disk surfaces and the air resident between the adjacent disks.. Rotating disk surfaces transfer rotational energy and movement to the air mass through the boundary layer at the air/disk interface.

As the air mass is rotated about the axis of the disk, the air closest to the axis of rotation generally will have a laminar flow pattern relative to the disk due to slower speed of the inner disk surface and less shearing action between the disk surface and the air mass. As the radial distance from the axis of rotation of the disk pack increases, the air flow becomes increasingly turbulent. The air is disturbed not only by the increased velocity of the disk surface breaking down the laminar flow boundary layers but also by the actuator arm which projects into the space between the adjacent disks of the disk pack.

The rotating disk pack acts as a pump as it attempts to discharge the air mass from the periphery of the disks. The pumping action and the associated frictional losses are undesirable because they consume a significant amount of energy. To accelerate the stationary air in the vicinity of the disk edges to approximately that of the velocity of the disk edge adds to the energy required to rotate the disk pack. Therefore, the combined load requires larger electrical energy expenditures together with larger disk drive motors and concomitant heating with the disk drive.

Because slider heads are aerodynamically supported relative to the disk surface on very thin air bearing flows, the environment within the disk drive must be very clean. Any inclusion of contaminants such as dust or other particles may cause damage to the disk surfaces if trapped between the disk surfaces and the slider, which is aerodynamically supported at a minute distance above the disk surface. Any solid contaminates trapped between the slider and the disk surface may score, scratch or damage the disk recording surface, destroying the ability of the disk to record data reliably at that location.

While efforts to eliminate particles within the disk drive are made during assembly, aging and use of the disk drive typically will result in subsequent deterioration of some components and additional contaminant particles being present in the disk drive.

The movement of the air within the disk pack may entrain and circulate the contaminant particles and significantly raise the probability of disk damage.

Complex and/or bulky filtering arrangements have been created to alleviate the contaminant problem in disk drives. The filtering approaches used to control the contaminants consume significant space and increase the complexity of the disk drives, thereby preventing or defeating extensive efforts to reduce the power consumption of the drive motors. Significant technological efforts have been made to reduce the size and electrical energy consumed by the disk drive motors.

With reduction in the size of disk drives becoming a most significant design consideration, improving response and reducing energy consumed by the pumping and displacement of the air within the disk drive becomes a significant objective. If the air within the disk drive can be confined generally within the disk pack and that mass of air moved, the pumping action of the rotating disks with respect to the air mass will continue to be present. A shrouded design is more efficient than a design where all of the air within the disk drive is disturbed. Shrouding of the disk pack has been beneficial in reducing the power required but does not totally overcome the pumping action of the rotating disk pack.

Typically, during the manufacturing and assembly of the disk drive, the disk pack and the disk drive motor are assembled to the disk drive base or frame and then the actuator is merged with the disk pack. Wherever there is a permanently mounted cylindrical shroud circumscribing most of the periphery of the disk pack, the assembly of the disk pack onto the disk drive base and the merging of the actuator assembly with the disk pack presents a formidable obstacle to reliable and efficient assembly. Obviously, assembly of the actuator and the disk pack without the obstruction of a shroud is significantly more simple and efficient.

The size and mass of the disks may be such that impact forces on the disk drive cause deformation of the disks or the support structure of the disk pack, possibly resulting in contact between adjacent disks. This contact can cause damage to the disk surfaces and generate undesirable particulate material which could damage the disks.

OBJECTS OF THE INVENTION

It is an object of the invention to provide an enhanced shrouding design permitting simplified assembly of the disk drive.

It is a another object of the invention to provide shrouding of the disk pack within a disk drive to occur after the assembly and merger of the disk pack and the actuator.

It is a further object of the invention to incorporate air filtration within the design of a disk pack shroud while at the same time maintaining a simplified disk drive design.

It is a still further object of the invention to utilize the structure of a substantially cylindrical shroud surrounding the disk pack of a disk drive to prevent undesired disk periphery excursions in the disk pack due to rough handling or impacting forces onto the disk drive.

SUMMARY OF THE INVENTION

A disk drive with a plurality of disks forming a disk pack is designed to be assembled so that the actuator and the disk pack are merged prior to the insertion of a shroud around the disk pack. The shrouding leaves sufficient access space provided for the proper and necessary movement of the actuator arms.

The shroud is formed of an elastic material which will deform readily to accommodate the forces and formation to a generally cylindrical shape necessary for installation of the shroud. Preferably, the shroud is designed to engage positioning and locating surfaces on the base of the disk drive and further to be engaged by locating and positioning surfaces associated with the cover of the disk drive, thereby trapping the shroud in its desired location whenever the disk drive is fully assembled. The shroud material is selected from materials having an elastic nature so that the air pressure created during disk drive operation will not create undesirable pulsation and vibration within the disk drive, and the shroud may be easily formed for assembly.

The shroud may be advantageously provided with ribs or flanges which extend radially inwardly toward the axis of the cylinder and axis of the rotatable disk pack. The ribs or flanges are disposed at spacings to be inserted and occupy some of the space between adjacent disks of the disk pack and extend toward the axis of rotation of the disk pack. The flanges provide abutment surfaces engagable by the disks if the disk drive should be impacted, mishandled, or dropped. The impact forces typically result in displacement of the periphery of the disks that could cause damage to the disks. Being elastic in nature, the flanges disposed between the adjacent disks absorb much of the force and prevent contact between adjacent disk surfaces.

Although formed as a generally a rectangular member, the shroud member ultimately is rolled or bent to a cylindrical shape. Advantageously, the shroud may be provided with an aperture therethrough extending from the chamber formed within the cylindrical form of the shroud to the air space outside the cylindrical shape of the shroud. The aperture may have disposed therein a thin flat air filter such as a mat or pad.

The aperture and the associated filter permit passage of air from within the cylindrical form of the shroud to the outside of the shroud with a desired air flow resistance to allow a controlled volume of air to be exchanged with the air outside the shroud, under the influence of the pressurizing and pumping action of the rotating disks of the disk pack, thereby using the otherwise undesirable pumping in an advantageous manner.

Accordingly, contaminants and foreign particles entrained within the air flow may be forced against and into the filtering material. The trapped or filtered contaminants and particles are prevented from being lodged between the surfaces of a disk and a slider and thus avoid surface damage to the disk.

A more complete understanding of the invention may be had by referring to the accompanying drawings and the detailed description of the invention to follow.

DETAILED DESCRIPTION OF THE INVENTION

Figure 1:
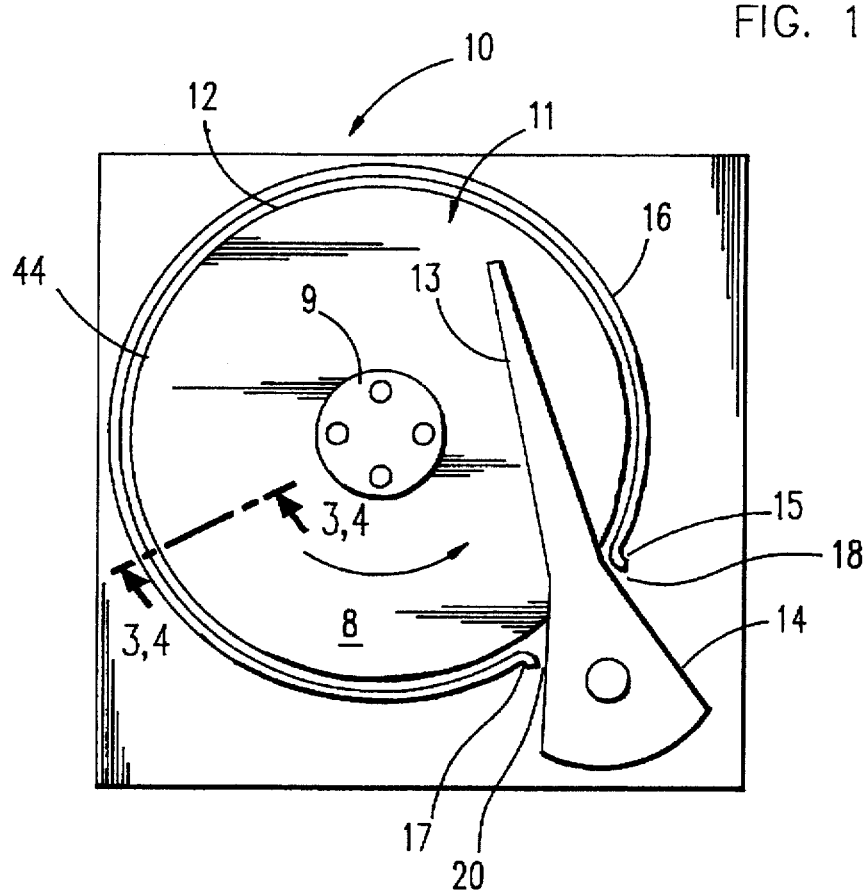
FIG. 1 is a schematic view of a disk drive with the cover removed incorporating the present invention.

Referring initially to FIG. 1, disk drive 10 is comprised of a rotatable disk pack 11 having a plurality of rigid or hard data storage disks 12 supported on a common hub 9 for rotation in a counterclockwise direction. Merged with disk pack 11 is an actuator 14 having a plurality of actuator arms 13. The actuator arms 13 extend over and between adjacent disks 12 of the disk pack 11. Without interfering with the movement and operation of the actuator 14, an elastic shroud insert 16 extends around and encompasses the disk pack 11 to the greatest extent possible. The elastic shroud 16 is disposed in close proximity to the periphery 44 of disks 12 and has only the minimum spacing opening between the end edges 15, 17 of the shroud 16 to permit the actuator 14 to operate and sweep across the disk surface 8.

An inlet region 18 communicating with the shroud 16 interior is defined by one end edge 15 of shroud 16 and the actuator 14; an outlet region 20 from the shroud 16 interior is defined by the other end edge 17 of the shroud 16 and the actuator 14. The inlet region 18 is disposed generally adjacent to and counterclockwise from the actuator 14 relative to the axis of rotation of the disk pack 11.

Figure 2:
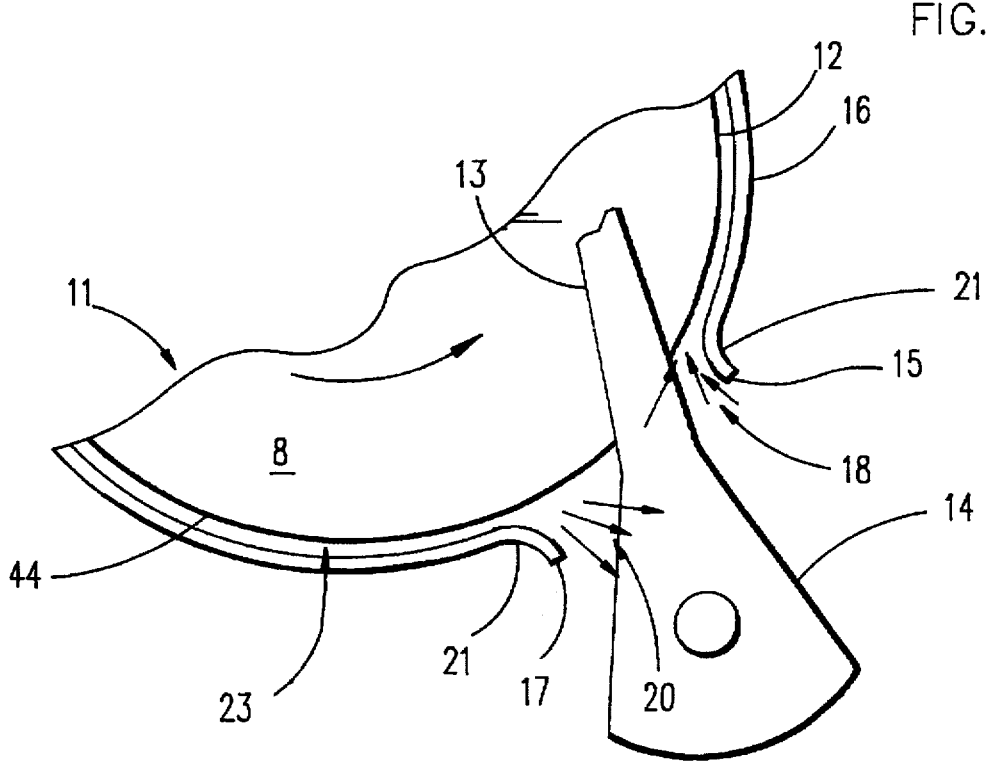
FIG. 2 is an enlarged illustration of the airflow inlet and outlet regions formed by the shroud of the present invention.

For construction details of the shroud 16, reference is now made to FIG. 2. Disk 12 is illustrated partially surrounded by the elastic shroud 16. As will be evident, whenever partial disk 12 rotates counterclockwise, the air in close proximity to the surface 8 of disk 12 will be pulled along by friction in the disk air interface and create a reduction in pressure in the region indicated as the inlet region 18. As disk 12 rotates and moves the air about the axis of rotation, pressure will build in some regions within the shrouded enclosure 23 and a higher pressure region near the outlet area 20 will result. This higher pressure causes an outward flow of air generally as indicated by the arrows in outlet region 20.

To minimize the turbulence of the air being pulled into or being expelled from the shroud 16 through inlet area 18 or outlet area 20 and to reduce the energy required, the shroud 16 preferably is shaped with a smoothly curved flange or lip 21 forming the end edges 15, 17. The flanges or lips 21 guide the air into and out of the shrouded enclosure 23 with minimum turbulence, further reducing the energy required to drive and maintain disk pack 11 at operational speeds. The edges 15, 17 of the shroud 16 are disposed as closely as possible to the actuator 14 while permitting the required operational movement of the actuator 14. This placement insures the maximum effect on energy savings.

Because the actuator 14 extends arms 13 into the interior of the shrouded area 23, this partial blockage is a significant factor in the creation of the pressure gradient within the shrouded area 23 and particularly the creation of a pressure gradient along the disk 12 edges 44. As air is pulled in through the inlet region 18 and moved counterclockwise with and by disks 12, the pressure will tend to build because the actuator 14 partially blocks and restricts the outlet region 20 and at least partially occupies the region between the outlet region 20 and inlet region 18. With the pressure being highest in the general region immediately upstream from the outlet region 20, the pressure gradient will exist with the lowest pressure at the inlet region 18.

Clearly the pressure at the inlet region 18 must be less than the pressure in the region exterior to the shroud 16 and the pressure in the outlet area 20 generally must be greater than the pressure exterior to the shroud 16, resulting in the flow as indicated by the arrows.

Figure 3:
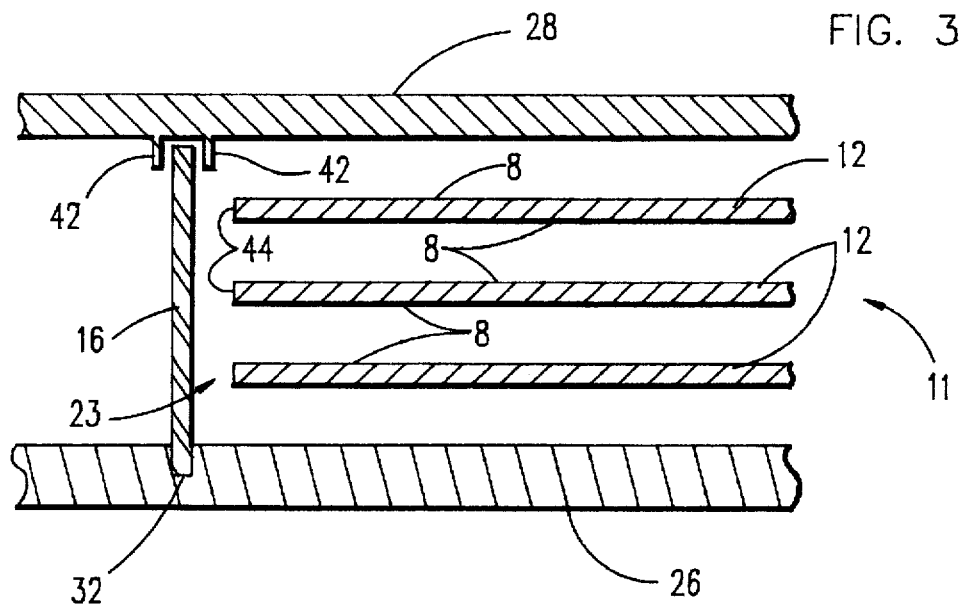
FIG. 3 is a partial and sectional view of a disk drive illustrating the installation of the elastic shroud insert within a disk drive.

Referring now to FIG. 3, the shroud 16 is illustrated as inserted into a locating feature 32 in the disk drive base 26. The locating feature 32 may exist in the form of a groove or it may be in the form of a series of holes 40 formed into base 26 to accept extensions 38 of shroud 16. Cover 28 provides a constraining arrangement by way of flanges 42 extending substantially normal to the cover 28. Thus, whenever the disk drive 10, comprising a plurality of disks 12, is assembled to the base 26 and after the actuator 14 has been merged with the disk pack 11, the shroud 16 then may be inserted into the locating feature 32. Thereafter, cover 28 is placed over the shroud 16, disk pack 11, actuator 14 of disk drive 10, and the flanges 42 straddle the top edge of shroud 16, thus constraining shroud 16 in a position in close proximity to the peripheral edges 44 of disks 12. A nominal shroud/disk gap typically would be something in the order of 1.0–3.0 mm.

Figure 4:
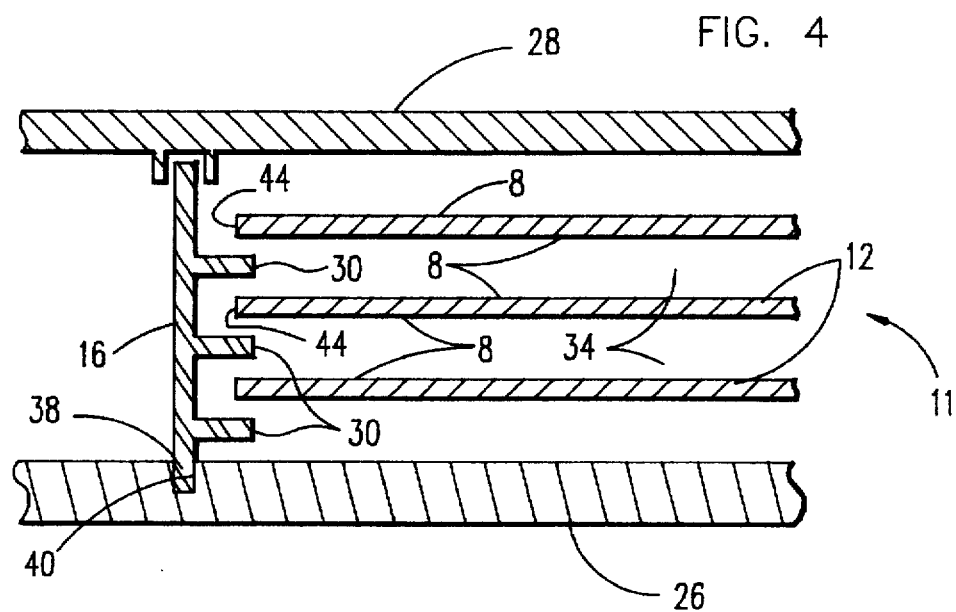
FIG. 4 is a partial and sectional view of the disk drive showing the elastic shroud of the present invention having a plurality of shock mitigation flanges disposed in close proximity to the disks of the disk pack.

An alternative embodiment of the shroud 16 which provides additional benefit is illustrated in cross-section in FIG. 4. FIG. 4 shows flanges or ribs 30 extending substantially normal to the shroud 16 and projecting radially inward into the inter-disk space 34 between adjacent disks 12 of the disk pack 11. The shroud 16 and the flanges 30 advantageously may be formed of an elastic material, such as plastic, to prevent creation of hard particles which may later damage the disk 12 and to absorb any impact of the periphery 44 of disks 12 against flanges 30 that might be caused by disk drive 10 either being dropped or roughly mishandled. Mishandling or dropping of disk drive 10 may result in a deformation or displacement of either the disks 12 or the mounting apparatus, not shown, which supports the disk pack 11 and hub 9 relative to the base 26. In either event, unwanted and unwarranted excursions of the disks 12 from their normal position are limited, thereby restricting any potential for damage to the disks 12. In all other aspects, the components shown in FIG. 4 are identical to those illustrated in FIG. 3.

Further illustrated is a mounting arrangement whereby the shroud 16 is positioned by inserting projections 38 into holes 40 which are formed into the base 26. More detail of projections 38 may be seen in FIG. 6.

Figure 5:
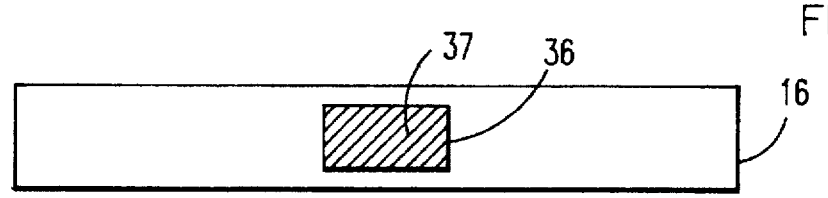
FIG. 5 illustrates the elastic shroud of the present invention with a filter element inserted therein and extending therethrough.
Figure 6:
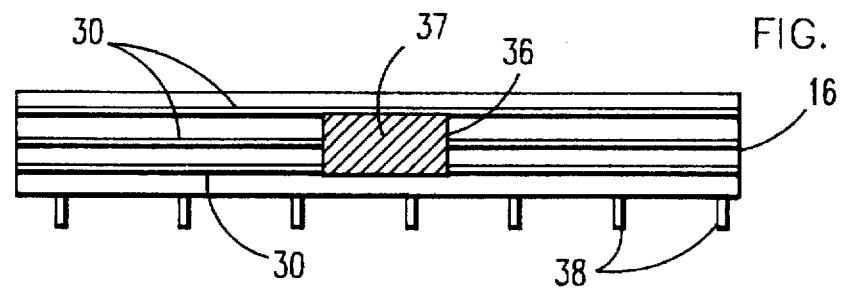
FIG. 6 illustrates the elastic shroud of the subject invention with locating and assembly members extending therefrom for engagement with the base of the disk drive.

Referring now to FIGS. 5 and 6, the elastic shroud 16 is illustrated in planar or form having an aperture 36 formed into the shroud 16 material. Inserted and mounted within aperture 36 is a thin filter pad 37 which may utilize either a matted fibrous material or similar particle filtering material that will trap and collect contaminates and foreign particles, while simultaneously permitting the airflow to pass.

As can be seen from FIGS. 5 and 6, the filter 37 will be located approximately opposite from the inlet/outlet regions 18, 20 as the shrouding 16 is formed and installed in the disk drive 10 and will facilitate the air flow from within the shroud 16 to the exterior of the shrouded region 23.

The positioning of the filter aperture 36 and the filter 37 with respect to the lengthwise or lateral dimension of the shroud 16 is primarily influenced by the pressure profile within the shrouded region 23. The shroud 16 and disk 12 rotation create a pressure profile as the air mass progresses about the disk pack 11. The magnitude of the pressure at any point within the shrouded region 23 may fluctuate due to the position of the actuator arms 13, sphere of the disk pack 11 and other factors; but there will be locations where the pressure is consistently positive relative to the ambient pressure within the disk drive 10.

The filtering aperture 36 must be disposed in a region where the pressure of the air within the shroud 16 exceeds the ambient pressure exterior to the shroud 16. This will insure an inside-to-outside flow direction and will positively trap any air entrained particles as the air is pumped or pushed through the filter 37. If only minimal filtering is desired, the filter 37 may be positioned closer to the inlet region 18 or may be disposed closer to the outlet region 20 for higher volume filtration. Also as desired, a chemical filter could be used in the aperture 36 to remove contaminate gases which may adversely react with the disk surface 8 materials. Alternatively, a combined chemical/particle filter may be substituted.

The preferred embodiment of the invention incorporates filtering of the air flow in an inside-to-outside flow path. This flow direction is preferred since the pumping action of the rotating disk pack 11 creates positive pressure sufficient for filtering. A negative pressure filtering arrangement may be created by positioning the filter aperture 36 close to the inlet edge 15 of shroud 16; however, the predictability of the air flow is less than that in the positive pressure flow. The positive pressure filtering arrangement is more efficient. As described and discussed earlier, the rotation of the disks 12 effectively pump the air through the filter 37 as pressure builds along the pressure gradient. The overriding advantages of disposing the filter 37 within the aperture 36 in shroud 16 are that the filtering arrangement consumes essentially no additional space within the disk drive 10 volume and the energy needed to filter the air has already been expended in rotating the disk pack and building the pressure gradient.

The shrouded disk pack 11 in drive 10 of the present invention provides several advantages not realized in high speed disk drives. A significant advantage is that the insertable shroud 16 provides a reduction in the required torque necessary to turn and maintain the disk pack 11 at operational speeds because of the reduction in the amount of turbulent air flow experienced by the disk surfaces 8. The shroud 16 tends to contain the air within the shrouded region 23 except at the outlet region 20, filter 37 and aperture 36. With reduced air turbulence, the torque required to rotate the disks 12 is significantly reduced allowing the concomitant reduction in drive motor size and heat build-up within the disk drive 10.

Further, the simplified arrangement utilizing filter 37 places no additional burden on the disk drive designer already limited by tight volumetric constraints. With reduction due to the shrouding 16 of the turbulence in the air within the disk pack 11, there will be a subsequent reduced tendency to stir up and entrain any additional contamination and particles which may exist within the disk drive 10; and by reducing that prospect, the possibility and probability of damage to the disks 12 are greatly reduced. Further, by using an inside-to-outside air flow direction through filter 37 as a result of a positive pressure with respect to the ambient pressure outside the shroud 16, filtering is more reliable and the movement of any air entrained contaminants or foreign particles is noticeably more effective.

With flanges or ribs 30 as illustrated in FIG. 4 provided for shock damage mitigation, it is very advantageous to combine the shock damage mitigation, filtering, and enhanced assembly aspects of the device into a single part of the disk drive 10. The elastic nature of shroud 16 both permits the assembly of the shroud 16 of FIGS. 4 and 6 having flanges 30 by progressively wrapping the shroud 16 about the exterior of the disk pack 11 as well as permits the insertion of the shroud 16 or projections 38 into the groove 32 or mounting holes 40 formed into the base 26. A permanently mounted shroud 16 having similar flanges 30 effectively would prevent positioning of the pre-assembled disk pack 11 into the disk drive 10.

The single elastic shroud 16 and particularly the filter 37 and flanges 30 are designed to occupy space within the disk drive 10 which otherwise would be unoccupied and thereby would not increase the volumetric requirements of disk drive 10 and at the same time would provide an enhanced operating environment for the disk pack 11 and actuator 14.

One of skill in the art will recognize that modifications may be made to the subject invention without removing the disk drive from within the scope of the appended claims which are intended to define the scope of the this invention.

I claim:

1. A disk drive comprising:

a frame;

a plurality of recordable data storage disks spatially fixed and mounted for rotation relative to said frame;

an actuator mounted for rotation relative to said frame and for scanning movement relative to said disk;

an enclosing member cooperatively associated with said frame to enclose said disk and said actuator;

an elastic shroud member disposed within said enclosing member and substantially encircling said data storage disks and insertable into said disposition after said data storage disks and said actuator have been merged;

said shroud comprising a filter disposed in an opening radially extending through said shroud.

2. The disk drive of claim 1 wherein said shroud member comprises a flanged inlet/outlet region accommodating said actuator.

3. The disk drive of claim 2 wherein said filter is disposed in said shroud at a location which is more than one third of the circumferential distance around said shroud from said inlet/outlet region in the direction of said disk rotation.

4. The disk drive of claim 2 wherein said filter is disposed in said opening in said shroud at a location where air pressure within said shroud exceeds air pressure outside said shroud within said enclosing member.

5. The disk drive of claim 1 wherein said shroud member further comprises at least one flange extending inwardly from said shroud to a distance sufficient to be partially disposed between at least outer regions of said disks and extending substantially the entire length of said shroud.

6. The disk drive of claim 1 wherein said frame and said enclosing member each comprise shroud engaging surfaces for positioning and holding said shroud therein.

7. A disk drive comprising:

a disk pack;

an actuator;

a housing supporting and enclosing said disk pack and said actuator; and a separate elastic shroud substantially encircling said disk pack;

said housing comprising means for mounting said shroud, said means for mounting comprising means for receiving and engaging opposed edges of said shroud to conform said shroud into a substantially cylindrical shape substantially encircling said disk pack and provide an access gap for said actuator, whereby said shroud may be inserted into said housing after assembly and merger of said actuator and said disk pack, thereby permitting more complete enclosure of said disk pack and simplified assembly of said disk drive.

8. The disk drive of claim 7 wherein said shroud further comprises:

an opening therein extending radially through said shroud, and a filter, and said filter disposed co-extensive with said opening, permitting airflow from within said shrouded disk pack to a region outside said shroud through said shroud.

9. The disk drive of claim 8 wherein said shroud comprises an air circulation input and output opening formed by two ends of said shroud and wherein said ends form outwardly projecting flanges.

10. The disk drive of claim 9 wherein said flanges form a smooth curved continuation of said shroud extending outwardly from said disk pack.

11. The disk drive of claim 8 wherein said filter is disposed at a location where internal air pressure within said shroud exceeds air pressure external to said shroud.

12. The disk drive of claim 11 wherein said filter is comprised of a mass of fibers.

13. The disk drive of claim 7 wherein said shroud further comprises at least one said inwardly extending flange disposed intermediate the outer regions of said disks, whereby excursions of said disks are limited by engagement with said inwardly extending flange.

14. The disk drive of claim 13 wherein adjacent disks of said disk pack form interdisk spaces and one said inwardly extending flange is disposed within each said interdisk space, thereby limiting excursions of said disks.

* * * * *